(12) United States Patent
Matsuda et al.

(10) Patent No.: US 7,348,068 B2
(45) Date of Patent: Mar. 25, 2008

(54) SURFACE-TREATED STEEL SHEET EXCELLENT IN CORROSION RESISTANCE, CONDUCTIVITY, AND COATING APPEARANCE

(75) Inventors: Takeshi Matsuda, Chiyoda-ku (JP); Akira Matsuzaki, Chiyoda-ku (JP); Kazuhisa Okai, Chiyoda-ku (JP)

(73) Assignee: JFE Steel Corporation (JP)

( * ) Notice: Subject to any disclaimer, the term of this patent is extended or adjusted under 35 U.S.C. 154(b) by 0 days.

(21) Appl. No.: 10/560,842

(22) PCT Filed: Nov. 18, 2004

(86) PCT No.: PCT/JP2004/017528

§ 371 (c)(1),
(2), (4) Date: Dec. 15, 2005

(87) PCT Pub. No.: WO2005/049314

PCT Pub. Date: Jun. 2, 2005

(65) Prior Publication Data

US 2006/0177685 A1    Aug. 10, 2006

(30) Foreign Application Priority Data

Nov. 21, 2003  (JP)  ............................. 2003-392957
Nov. 21, 2003  (JP)  ............................. 2003-392958

(51) Int. Cl.
*B32B 15/04*   (2006.01)
*B32B 15/08*   (2006.01)
*B32B 15/18*   (2006.01)
*B32B 15/20*   (2006.01)

(52) U.S. Cl. ...................... 428/626; 428/215; 428/336; 428/469; 428/653; 428/659; 428/681

(58) Field of Classification Search ................ 428/626, 428/624, 632, 633, 653, 659, 681, 215, 336, 428/469, 457, 461
See application file for complete search history.

(56) References Cited

U.S. PATENT DOCUMENTS

2003/0072962 A1 *  4/2003  Matsuzaki et al. .......... 428/623
2006/0182988 A1 *  8/2006  Yamaji et al. .............. 428/629

FOREIGN PATENT DOCUMENTS

| JP | 53-27694 | | 3/1978 |
|---|---|---|---|
| JP | 63-90581 | A | 4/1988 |
| JP | 8-325760 | A | 12/1996 |
| JP | 2002-053979 | * | 2/2002 |
| JP | 2002-53979 | A | 2/2002 |
| JP | 2002-053980 | * | 2/2002 |
| JP | 2002-53980 | A | 2/2002 |
| JP | 2003-300278 | * | 10/2003 |
| JP | 2003-300278 | A | 10/2003 |
| WO | WO 01/42530 | A1 | 6/2001 |

* cited by examiner

*Primary Examiner*—Michael E. Lavilla
(74) *Attorney, Agent, or Firm*—DLA Piper US LLP

(57) ABSTRACT

A surface-treated steel sheet includes a steel sheet; a plating layer containing at least one metal selected from zinc and aluminum; a first layer film containing (α) 1 to 2000 mg/m² of silica in terms of $SiO_2$, (β) a total of 1 to 1000 mg/m² of phosphoric acid groups in terms of P, (γ) a total of 0.5 to 800 mg/m² of at least one metal selected from Mg, Mn, and Al, and (δ) 0.1 to 50 mg/m² of a tetravalent vanadium compound; and a second layer film formed to a thickness of 0.1 to 5 μm on the first layer film and containing a resin (A) having at least one type of functional group selected from OH and COOH groups, and at least one rust-proofing additive (B) selected from (a) a phosphate, (b) Ca ion-exchanged silica, (c) a molybdate, (d) silicon oxide, and (e) at least one organic compound selected from triazoles, thiols, thiadiazoles, thiazoles, and thiurams.

3 Claims, No Drawings

SURFACE-TREATED STEEL SHEET EXCELLENT IN CORROSION RESISTANCE, CONDUCTIVITY, AND COATING APPEARANCE

TECHNICAL FIELD

This disclosure relates to a surface-treated steel sheet optimum for use in automobiles, household electric appliances, or building materials. Particularly, this disclosure relates to an environment-conscious surface-treated steel sheet not containing hexavalent chromium (Cr(VI)) which is likely to adversely affect workers, users, or environments of use during wastewater treatment in manufacturing or handling of products.

BACKGROUND ART

Steel sheets with surfaces plated with zinc- or aluminum-containing coatings and further treated with chromate are conventionally widely used as steel sheets for automobiles, household electric appliances, and building materials. In chromate treatment, a chromate layer is formed using a treatment solution containing hexavalent chromium (Cr(VI)) as a main component, for improving corrosion resistance (resistance to white rust and resistance to red rust). However, the chromate treatment uses hexavalent chromium (Cr(VI)) which is a pollution control substance, and thus a film subjected to non-polluting treatment not using hexavalent chromium (Cr(VI)) has recently been proposed in view of the influence on environments and human bodies. In particular, several methods using organic compounds or organic resins have been proposed. Examples of such methods are given below.

(1) Japanese Unexamined Patent Application Publication No. 63-90581 discloses a method using a thermosetting paint containing an epoxy resin, an amino resin, and tannic acid.

(2) Japanese Unexamined Patent Application Publication No. 8-325760 discloses a method utilizing the chelating force of tannic acid by using a mixed composition containing an aqueous resin and polyhydric phenolcarboxylic acid.

(3) Japanese Examined Patent Application Publication No. 53-27694 discloses a surface treatment method in which a hydrazine derivative aqueous solution is coated on a surface of a tinned or galvanized steel sheet.

(4) Japanese Unexamined Patent Application Publication Nos. 2002-53980 and 2002-53979 disclose a technique for forming a phosphoric acid and/or phosphoric acid compound film containing an oxide as a lower layer, and then forming an organic composite coating comprising a resin film as an upper layer.

However, these conventional techniques have the following problems:

Any one of methods (1) to (3) causes insufficient corrosion resistance due to the fact that the resulting film has no self-healing effect.

The corrosion resistance of a chromate film is exhibited by the synergetic effect of a barrier effect and a self-healing effect. The barrier effect is a barrier effect against corrosion factors (water, oxygen, chlorine, and the like) of a slightly soluble compound (hydrous oxide) mainly composed of trivalent Cr. The self-healing effect is the effect of forming a protective film by hexavalent Cr (Cr(VI)) at a corrosion origin.

In chromium-free techniques (1) to (3), the barrier effect can be imparted to some extent by an organic resin or the like without using chromium. However, the self-healing effect cannot be exhibited by hexavalent Cr (Cr(VI)), and thus a high degree of corrosion resistance cannot be realized.

On the other hand, in technique (4), the corrosion resistance is improved to some extent by adding a specified substance exhibiting the self-healing effect to the upper layer. However, the corrosion resistance is not necessarily sufficiently improved. This is because the film formed at the interface between the zinc coating and the upper layer, i.e., the lower layer, does not contain hexavalent Cr (Cr(VI)), thereby failing to obtain a direct rust-proofing effect due to the self-healing effect.

Accordingly, it could be advantageous to provide a surface-treated steel sheet exhibiting excellent corrosion resistance, excellent conductivity, and excellent coating appearance even when the film does not contain a pollution control substance such as hexavalent chromium (Cr(VI)).

SUMMARY

We provide a surface-treated steel sheet comprising:

a steel sheet;

a plating layer provided on at least one of the surfaces of the steel sheet, the plating layer containing at least one metal selected from the group consisting of zinc and aluminum;

a first layer film provided on the surface of the plating layer, the first layer film containing ($\alpha$) 1 to 2000 mg/m$^2$ of silica in terms of SiO$_2$, ($\beta$) a total of 1 to 1000 mg/m$^2$ of phosphoric acid groups in terms of P, ($\gamma$) a total of 0.5 to 800 mg/m$^2$ of at least one metal selected from the group consisting of Mg, Mn, and Al in terms of a metal element, and ($\delta$) 0.1 to 50 mg/m$^2$ of a tetravalent vanadium compound in terms of V; and a second layer film formed to a thickness of 0.1 to 5 µm on the first layer film and containing a resin (A) having at least one type of functional group selected from the group consisting of OH and COOH groups, and at least one rust-proofing additive (B) selected from the group consisting of the following compounds (a) to (e):

(a) a phosphate;

(b) Ca ion-exchanged silica;

(c) a molybdate;

(d) silicon oxide; and (e) at least one organic compound selected from the group consisting of triazoles, thiols, thiadiazoles, thiazoles, and thiurams.

In the surface-treated steel sheet, the resin (A) is preferably a product (X) of reaction of a film-forming organic resin with an active hydrogen-containing substance (D) partially or entirely comprising a hydrazine derivative (C) having active hydrogen.

We also provide a surface-treated steel sheet having excellent corrosion resistance, conductivity, and coating appearance, the steels sheet comprising a steel sheet having a zinc-based or aluminum-based coating, a composite oxide film formed as a first layer film on a surface of the steel sheet and containing ($\alpha$) silica, ($\beta$) phosphoric acid and/or a phosphoric acid compound, ($\gamma$) at least one metal selected from the group consisting of Mg, Mn, and Al (the metal may be contained as a compound and/or a complex compound), and (δ) a tetravalent vanadium (IV) compound, the coating weights of these components being as follows:

(α) silica: 1 to 2000 mg/m² in terms of $SiO_2$;

(β) phosphoric acid and/or a phosphoric acid compound: a total of 1 to 1000 mg/m² in terms of P;

(γ) at least one metal selected from the group consisting of Mg, Mn, and Al: a total of 0.5 to 800 mg/m² in terms of Mg, Mn, and Al; and (δ) a tetravalent vanadium compound: 0.1 to 50 mg/m² in terms of V; and an organic film formed as a second layer film having a thickness of 0.1 to 5 μm on the first layer film and containing an organic polymeric resin (A) having an OH group and/or a COOH group, and at least one rust-proofing additive (B) selected from the group consisting of the compounds (a) to (e) below in a total of 1 to 100 parts by mass (solid content) relative to 100 parts by mass (solid content) of the resin (A):

(a) a phosphate;

(b) Ca ion-exchanged silica;

(c) a molybdate;

(d) silicon oxide; and (e) at least one organic compound selected from the group consisting of triazoles, thiols, thiadiazoles, thiazoles, and thiurams.

DETAILED DESCRIPTION

As a result of intensive research, we found that corrosion resistance can be significantly improved by forming a specified composite oxide film containing a tetravalent vanadium compound as a first layer film on a surface of a steel sheet having a coating containing at least one metal selected from zinc and aluminum, and then forming an organic film as a second layer film on the first layer film, the organic film containing a specified organic polymeric resin and a specified self-healing substance at an appropriate ratio.

Details will be described below.

Usable examples of a steel sheet having a zinc-containing coating and used as a base of a surface-treated steel sheet of the present invention include a galvanized steel sheet, a Zn—Ni alloy plated steel sheet, a Zn—Fe alloy plated steel sheet (electroplated steel sheet or alloying hot-dip galvanized steel sheet), a Zn—Cr alloy plated steel sheet, a Zn—Mn alloy plated steel sheet, a Zn—Co alloy plated steel sheet, a Zn—Co—Cr alloy plated steel sheet, a Zn—Cr—Ni alloy plated steel sheet, a Zn—Cr—Fe alloy plated steel sheet, a Zn—Al alloy plated steel sheet (for example, a Zn-5% Al alloy plated steel sheet or Zn-55% Al alloy plated steel sheet), a Zn—Mg alloy plated steel sheet, Zn—Al—Mg alloy plated steel sheet, further a zinc or a zinc alloy composite plated steel sheets prepared by dispersing a metallic oxide, a polymer, or the like into the plating film of any one of the aforementioned plated steel sheets (for example, Zn—$SiO_2$ dispersion-plated steel sheets).

Among these plated-steel sheets, a multilayer-plated steel sheet having at least two plating layers which are the same or different may be used.

As the steel sheet having an aluminum-containing coating and used as the base of the surface-treated steel sheet, an aluminum-plated steel sheet, an Al—Si alloy plated steel sheet, or the like can be used.

The plated steel sheet may be produced by plating a surface of a steel sheet with Ni at a low coating weight, and then plating the steel sheet with any one of the above-described plating layers.

As the plating method, any one of practicable methods such as electrolytic method (electrolysis in an aqueous solution or a non-aqueous solvent), a hot-dipping method, and a vapor phase method.

When the two-layer plating film is formed on the plating film as described below, in order to prevent the occurrence of defects or unevenness in the surface of the plating film, the plating film surface can be previously treated by alkali degreasing, solvent degreasing, surface controlling (alkaline surface controlling or acidic surface controlling), or the like according to demand. In order to prevent blackening (a type of oxidation phenomenon of a plated surface) in an environment in which the surface-treated steel sheet is used, the surface of the plating film can be previously treated by surface control with an acid or alkali aqueous solution containing an iron-group metal ion (at least one selected from Ni ion, Co ion, and Fe ion) according to demand. When the electrogalvanized steel sheet is used as the base steel sheet, in order to prevent blackening, an iron-group metal ion (at least one selected from Ni ion, Co ion, and Fe ion) may be added to an electroplating bath so that the plating film contains 1 ppm or more of the metal. In this case, the upper limit of the content of the iron-group metal contained in the plating film is not particularly limited.

Next, description will be made of the first layer film (referred to as a "composite oxide film" hereinafter) formed on the surface of the plated steel sheet of the present invention.

The composite oxide film is completely different from a conventional alkali silicate treatment film represented by a film composition comprising lithium oxide and silicon oxide. Namely, the first layer film of the present invention is the composite oxide film containing the following components:

(α) silica;

(β) a phosphoric acid group;

(γ) at least one metal selected from Mg, Mn, and Al; and (δ) a tetravalent vanadium compound.

By adding the four components, the specific rust-proofing effect described below can be obtained.

As the silica as component (α), colloidal silica is particularly preferred from the viewpoint of corrosion resistance. In particular, silica having a particle diameter of 14 nm or less, preferably 8 nm or less, is preferred.

Alternatively, a dispersion of fumed silica fine particles in a film composition solution can be used. In this case, the particle diameter is preferably 12 nm or less, and more preferably 7 nm or less.

The coating weight of component (α) in the film per side is 1 to 2000 mg/m² in terms of $SiO_2$. When the coating weight is less than 1 mg/m² in terms of $SiO_2$, the effect of addition of component (α) cannot be sufficiently expected. On the other hand, when the coating weight exceeds 2000 mg/m², problems of adhesion and blackening occur. The coating weight is more preferably 5 to 1000 mg/m², and most preferably 10 to 200 mg/m².

Next, the phosphoric acid group as component (β) will be described. In general, the term "acid group" means a residual radical after at least one hydrogen atom replaceable with a metal is removed from an acid molecule. In the present invention, the "phosphoric acid group" means a residual radical after at least one hydrogen atom replaceable with a metal is removed from a phosphoric acid analogue. Such a phosphoric acid analogue represents a phosphorus-containing acid. Examples of the phosphoric acid analogue include a series of acids produced by various degrees of hydration of phosphorus pentoxide, such as condensed phosphoric acids, for example, orthophosphoric acid, metaphosphoric acid, pyrophosphoric acid, tripolyphosphoric acid, and polyphosphoric acid, and phosphorous acids such as phosphorous acid and hypophosphorous acid. More specifically, phosphoric acid and/or a phosphoric acid compound is used as the phosphoric acid group. Examples of the phosphoric acid and/or phosphoric acid compound include the above-described phosphoric acid analogues and various salts thereof. These compounds may be used alone or in a mixture of two or more. Examples of salts of orthophosphoric acid include primary phosphates, secondary phosphates, and tertiary phosphates. At least one of the metal salts and the compounds can be mixed as a film component by adding to the film composition.

The tetravalent vanadium compound as component (δ) may include a vanadium compound with another valency as long as the tetravalent vanadium compound is contained as a main component (50 wt % or more). Of course, the content of the tetravalent vanadium compound as component (δ) is preferably as high as possible, and only the tetravalent vanadium compound is more preferably added as component (δ). Preferred examples of the tetravalent vanadium compound include an oxide, hydroxide, sulfide, sulfate, carbonate, halide, nitride, fluoride, carbide, and cyanide (thiocyanide) of tetravalent vanadium, and salts thereof. These compounds can be used alone or in a mixture of two or more. As the tetravalent vanadium compound, a tetravalent vanadium compound produced by reducing a pentavalent vanadium compound using a reducing agent is preferably used from the viewpoint of corrosion resistance and resistance to blackening. In this case, the reducing agent used may be either inorganic or organic, but an organic agent is more preferred.

The coating weight of component (β) in the film per side is 1 to 1000 mg/m$^2$ in total in terms of P. When the coating weight is less than 1 mg/m$^2$ in terms of P, the effect of addition of component (β) cannot be sufficiently expected. On the other hand, when the coating weight exceeds 1000 mg/m$^2$, problems with corrosion resistance and spot weldability occur. The coating weight is more preferably 5 to 500 mg/m$^2$, and most preferably 10 to 100 mg/m$^2$.

The form of at least one metal selected from Mg, Mn, and Al and present as component (γ) in the film is not particularly limited. The metal may be contained as a compound and/or a complex compound. The metal is usually added to the film as a part of a metal compound. The metal may be present as an elemental metal, a compound such as an oxide, a hydroxide, a hydrous oxide, a phosphoric acid compound, a coordination compound, or the like, or a complex compound. The ionicity and solubility of these compounds such as a hydroxide, a hydrous oxide, a phosphoric acid compound, a coordination compound, and the like are not particularly limited. Therefore, the metal component may be a metal contained as a part of the phosphoric acid compound, or a metal contained as a part of another metal compound. The film of the present invention does not eliminate the coexistence of another metal or metal compound. However, of course, chromium or a chromium compound is excluded in view of the pollution prevention purpose of the present invention. This is because a chromium-free film is obtained.

In an example of the method for introducing component (γ) in the film, a phosphate, a sulfate, a nitrate, a chloride, or the like of Mg, Mn, or Al may be added to the film composition.

The coating weight of component (γ) in the film per side is 0.5 to 800 mg/m$^2$ in terms of a total of Mg, Mn, and Al. When the coating weight is less than 0.5 mg/m$^2$ in terms of a total of Mg, Mn, and Al, the effect of addition of component (γ) cannot be sufficiently expected. On the other hand, when the coating weight exceeds 800 mg/m$^2$, problems of corrosion resistance and film appearance occur. The coating weight is more preferably 1 to 500 mg/m$^2$, and most preferably 5 to 100 mg/m$^2$.

In the present invention, the tetravalent vanadium compound as component (δ) may include a vanadium compound with another valency as long as the tetravalent vanadium compound is contained as a main component (50 wt % or more). Of course, the content of the tetravalent vanadium compound as component (δ) is preferably as high as possible, and only the tetravalent vanadium compound is more preferably added as component (δ). Preferred examples of the tetravalent vanadium compound include an oxide, hydroxide, sulfide, sulfate, carbonate, halide, nitride, fluoride, carbide, and cyanide (thiocyanide) of tetravalent vanadium, and salts thereof. These compounds can be used alone or in a mixture of two or more. As the tetravalent vanadium compound, a tetravalent vanadium compound produced by reducing a pentavalent vanadium compound using a reducing agent is preferably used from the viewpoint of corrosion resistance and resistance to blackening. In this case, the reducing agent used may be either inorganic or organic, but an organic agent is more preferred.

When a pentavalent vanadium compound is used as a main component of component (δ), a uniform film cannot be formed due to the low stability of a treatment solution, thereby failing to achieve sufficient corrosion resistance. When a divalent or trivalent vanadium compound is used as a main component, the corrosion resistance is unsatisfactory. On the other hand, when the tetravalent vanadium compound is used, such a problem does not occur. Therefore, the excellent corrosion resistance can be achieved by the synergic effect of components (α) to (γ).

The coating weight of component (δ) in the film per side is 0.1 to 50 mg/m$^2$ in terms of V. When the coating weight is less than 0.1 mg/m$^2$ in terms of V, the effect of addition of component (δ) cannot be sufficiently expected. On the other hand, when the coating weight exceeds 50 mg/m$^2$, problems of coloring and blackening occur. The coating weight is more preferably 0.5 to 30 mg/m$^2$, and most preferably 1 to 10 mg/m$^2$.

When the first film (composite oxide film) containing the above components is formed on the plated steel sheet, extremely excellent corrosion resistance can be achieved. Although not necessarily known, the possible reason for this lies in the following mechanism:

First, with respect to the function as a barrier film, the compact, slightly soluble composite oxide film blocks a corrosion factor to exhibit a high degree of barrier effect. This is possibly due to the functions: (i) Silica forms a stable compact barrier film together with the phosphoric acid or phosphoric acid compound and the metal as the component (γ). (ii) The silicate acid ions in silica promote the formation of basic zinc chloride in a corrosive environment to improve the barrier property. (iii) A slightly soluble salt is formed by tetravalent vanadium ions $VO_2^+$ and complex ions thereof (for example, $[VO(SO_4)_2]^{2-}$) of the tetravalent vanadium compound added and phosphoric acid ions in the film, thereby improving the barrier property. (iv) A uniform film can be formed because the tetravalent vanadium compound has excellent stability of the treatment solution, unlike a pentavalent vanadium compound. In particular, a compact and slightly soluble film containing the metal as component (γ) and the vanadium compound included through bonds to the phosphoric acid ions and silica may be formed, and functions (i) to (iv) discribed above may be organically combined to achieve a high degree of barrier effect.

The composite oxide film further has an excellent self-healing effect in addition to the above-described high degree of barrier effect. This is possibly due to the functions: (I) When a defect occurs in the film, OH ions are produced by cathode reaction to alkalinize the interface, and thus component (γ) precipitates as a metal hydroxide, which is a compact and slightly soluble product, and seals the defect, thereby preventing corrosion. (II) As described above, the phosphoric acid or phosphoric acid compound contributes to the compactness of the composite oxide film, and zinc ions dissolved in a film defect due to anodic reaction, which is corrosion reaction, are captured by the phosphoric acid component to form a precipitate product as a slightly soluble zinc phosphate compound. (III) The tetravalent vanadium compound is reduced by its own oxidizing function to form an oxide or hydroxide film on the surface of the plating layer, the oxide or hydroxide film exhibiting a self-healing function. With respect to the self-healing function, particularly, a film containing the metal as the component (γ) and the vanadium compound, which are included through bonds to the phosphoric acid ions and silica, is formed, and the functions (I) to (III) are organically combined to achieve a high degree of self-healing effect.

The extremely excellent corrosion resistance is realized by the above-described high degrees of barrier effect and self-healing effect.

Next, the second layer film (referred to as the "organic film" hereinafter) formed on the composite oxide film (first layer film) will be described.

The organic film formed on the first layer film contains an organic polymeric resin (A) (referred to as a "resin (A)" hereinafter) having at least one functional group selected from the group consisting of OH and COOH groups, and at least one rust-proofing additive (B) selected from the group consisting of the following self-healing substances (a) to (e):

(a) a phosphate;

(b) Ca ion-exchanged silica;

(c) a molybdate;

(d) silicon oxide; and (e) at least one organic compound selected from triazoles, thiols, thiadiazoles, thiazoles, and thiurams.

The rust-proofing additive may contain at least one substance selected from the group consisting of the substances (a) to (e) as a main component.

As a base resin of the organic film, the organic polymeric resin (A) having OH and/or COOH is used. The base resin means a raw material resin used for forming the organic film containing the rust-proofing additive (B).

Preferred examples of the organic polymeric resin (A) include epoxy resins, polyhydroxy polyether resins, acrylic copolymer resins, ethylene-acrylic acid copolymer resins, alkyd resins, phenol resins, and polyurethane resins. However, even if a monomer used as a raw material does not contain OH and/or COOH, an OH group and/or a COOH group can be introduced in the resin (A) by oxidizing or carbonating the resin. Examples of such a raw material resin include polybutadiene resins, polyamine resins, and polyphenylene resins. The resin (A) can also be produced by copolymerization with a compound having an OH group and/or a COOH group or modification with a compound having an OH group and/or a COOH group. These resins may be used in a mixture or as an addition polymer of two or more.

Examples of such a resin include modified epoxy resins, acrylic copolymer resins copolymerized with an epoxy-containing monomer, epoxy-containing polybutadiene resins, epoxy-containing polyurethane resins, and adducts or condensates of these resins.

Epoxy Resin

Usable examples of epoxy resins include glycidyl-etherified epoxy resins produced from bisphenol A, bisphenol F, or novolak, glycidyl-etherified epoxy resins produced by adding propylene oxide, ethylene oxide, or polyalkylene glycol to bisphenol A, aliphatic epoxy resins, alicyclic epoxy resins, and polyether epoxy resins.

Particularly, when low-temperature curing is required, the epoxy resin preferably has a number-average molecular weight of 1500 or more.

The modified epoxy resins can be produced by reacting the epoxy groups or hydroxyl groups of the above-mentioned epoxy resins with any one of various modifiers. Examples of the modified epoxy resins include epoxyester resins produced by reaction with carboxyl groups in drying-oil fatty acids, epoxyacrylate resins produced by modification with acrylic acid or methacrylic acid, urethane-modified epoxy resins produced by reaction of epoxy resins with isocyanate compounds, and amine-added urethane-modified epoxy resins produced by adding alkanol amine to urethane-modified epoxy resins produced by reaction with isocyanate compounds.

Examples of the acrylic copolymer resins copolymerized with an epoxy-containing monomer include resins synthesized by solution polymerization, emulsion polymerization, or suspension polymerization of an epoxy-containing unsaturated monomer, and a polymerizable unsaturated monomer component essentially including an acrylic acid ester or methacrylic acid ester.

Examples of the polymerizable unsaturated monomer component include C1 to C24 alkyl esters of acrylic acid or methacrylic acid, such as methyl (meth)acrylate, ethyl (meth)acrylate, propyl (meth)acrylate, n-, iso- or tert-butyl (meth)acrylate, hexyl (meth)acrylate, 2-ethylhexyl (meth)acrylate, decyl (meth)acrylate, and lauryl (meth)acrylate; acrylic acid, methacrylic acid, styrene, vinyl toluene, acrylamide, acrylonitrile, N-methylol (meth)acrylamide, C1 to C4 alkyl ethers of N-methylol (meth)acrylamide; and N,N-diethylaminoethyl methacrylate.

Examples of the epoxy-containing unsaturated monomer include glycidyl methacrylate, glycidyl acrylate, and 3,4-epoxycyclohexylmethyl (meth)acrylate. The epoxy-containing unsaturated monomer is not particularly limited as long as is contains an epoxy group and a polymerizable unsaturated group.

The acrylic copolymer resin copolymerized with the epoxy-containing monomer may be modified with a polyester resin, an epoxy resin, a phenol resin, or the like.

In particular, the epoxy resin is preferably a product of reaction between bisphenol A and epihalohydrin because of excellent corrosion resistance, the product being a resin having a chemical structure represented by formula (1).

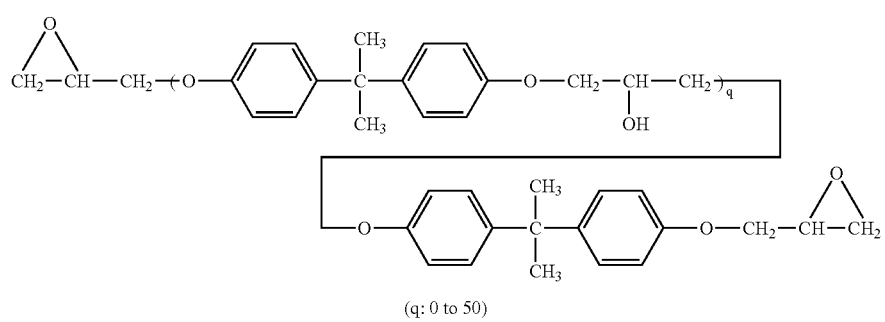

(1)

(q: 0 to 50)

A method for producing the bisphenol A epoxy resin is widely used in the industry. In the above chemical structure, q is 0 to 50, preferably 1 to 40, and more preferably 2 to 20.

The resin (A) may be any one of an organic solvent-soluble type, an organic solvent-dispersible type, a water-soluble type, and a water-dispersible type.

The polyhydroxy polyether resin is a polymer produced by polycondensation of a mononuclear or dinuclear dihydric phenol or a mixture of mononuclear and dinuclear dihydric phenols with substantially an equal mole of epihalohydrin in the presence of an alkali catalyst. Typical examples of the mononuclear dihydric phenol include resorcin, hydroquinone, and catechol. Typical examples of the binuclear phenol include bisphenol A.

Phenol Resin

Phenol resins are thermosetting resins produced by reaction of phenols with formaldehyde, and conventional phenol resins can be directly used. For example, cresol resins and xylenol resins can also be used.

Urethane Resin

Examples of urethane resins include oil-modified polyurethane resins, alkyd polyurethane resins, polyester urethane resins, polyether urethane resins, and polycarbonate polyurethane resins.

Alkyd Resin

Examples of alkyd resins include oil-modified alkyd resins, rosin-modified alkyd resins, phenol-modified alkyd resins, styrene alkyd resins, silicon-modified alkyd resins, acryl-modified alkyd resins, oil-free alkyd resins, and high-molecular-weight oil-free alkyd resins.

Acrylic Resin

Examples of acrylic resins include polyacrylic acid and copolymers thereof, polyacrylic acid esters and copolymers thereof, polymethacrylic acid esters and copolymers thereof, urethane-acrylic acid copolymers (or urethane-modified acrylic resins), and styrene-acrylic acid copolymers. These resins may be further modified with another alkyd resin, epoxy resin or phenol resin.

Polyolefin Resin (Ethylene Resin)

Examples of polyolefin resins include ethylene resins such as ethylene-acrylic acid copolymers, ethylene-methacrylic acid copolymers, and carboxyl-modified polyolefin resins; ethylene-unsaturated carboxylic acid copolymers; and ethylene ionomers. These resins may be further modified with another alkyd resin, epoxy resin or phenol resin.

Acrylsilicone Resin

Examples of acrylsilicone resins include resins each containing an acrylic copolymer as a base resin, which has a hydrolyzable alkoxysilyl group in its side chain or terminal, and a curing agent added thereto. When such an acrylsilicone resin is used, excellent weather resistance can be expected.

Fluororesin

Examples of fluororesins include fluoroolefin copolymers, for example, a copolymer produced by copolymerization of a fluorine monomer (fluoroolefin) with another monomer such as an alkyl vinyl ether, a cycloalkyl vinyl ether, a carboxylic acid-modified vinyl ester, a hydroxyalkyl allyl ether, or tetrafluoropropyl vinyl ether.

When such a fluororesin is used, excellent weather resistance and excellent hydrophobicity can be expected.

Among the above-described resins, thermosetting resins are preferred. Particularly, an epoxy resin and modified epoxy resin having an excellent block property against a corrosive factor such as oxygen are optimum. Even when the coating weight of the film is decreased for realizing high degrees of conductivity and spot weldability, the epoxy resin and modified epoxy resin are particularly advantageous because the corrosion resistance and film appearance can be maintained.

To improve the corrosion resistance of the organic film, a thermosetting resin and a curing agent are preferably mixed. In this case, an amino resin such as an urea resin (e.g. butylated urea resin or the like), a melamine resin (e.g. butylated melamine resin), a butylated urea-melamine resin, a benzoguanamine resin, or the like, block isocyanate, an oxazoline compound, a phenol resin, or the like can be added as the curing agent.

In order to decrease the drying temperature of the resin, a water-dispersible resin comprising core-shell structure each using resins having different glass transition temperatures for the core and the shell, respectively, can be used.

Alternatively, a self-crosslinkable, water-dispersible resin can be used. For example, when an alkoxysilane group is introduced to the resin particles, during heat-drying of the resin, crosslinking can be produced between the particles by the formation of a silanol group due to hydrolysis of the alkoxysilane and dehydration condensation reaction of the silanol group between the resin particles.

As the resin used for the organic film, an organic complex silicate produced by combining an organic resin and silica with a silane coupling agent is also preferred.

The organic polymeric resin (A) is preferably a product (X) of reaction of a film-forming organic resin with an active hydrogen-containing material (D) entirely or partially comprising a hydrazine derivative (C) having active hydrogen. The active hydrogen-containing material (D) may be a mixture or a compound. Namely, the active hydrogen-containing material (D) entirely or partially comprises the hydrazine derivative (C) having active hydrogen. In the present invention, the resin (A) (or the organic polymeric resin (A)) is more preferably the reaction product (X) produced by modifying the film-forming organic resin with the active hydrogen-containing material (D), the product (X) corresponding to a modified resin having an OH group and/or COOH group.

In order to more clearly define the active hydrogen-containing material (D), each of the constituent units will be described in further detail below.

As the film-forming organic resin (A), a resin containing an epoxy group is particularly preferred from the viewpoint of reactivity and corrosion resistance. The epoxy group-containing resin (E) is not particulaly limited as long as the resin (E) can react with the active hydrogen-containing material (D) entirely or partially comprising the hydrazine derivative (C) having active hydrogen, thus the active hydrogen-containing material (D) can be bonded to the film-forming organic resin by the reactions such as addition or condensation, and a film can be properly formed.

It is desired that the hydrazine derivative (C) is introduced to the molecule of the film-forming organic resin (A). Therefore, at least a part (preferably the whole) of the active hydrogen-containing material (D) is composed of the hydrazine derivative (C) having active hydrogen. In the present invention, the active hydrogen can be determined by the presence of reactivity to the resin. For example, hydrogen reactive to an epoxy group can be determined to be active hydrogen.

When the film-forming organic resin (A) is the epoxy-containing resin (E), for example, the active hydrogen-containing material (D) reactive to the epoxy group has the following component:

a hydrazine derivative having active hydrogen;
a primary or secondary amine compound having active hydrogen;
ammonia or an organic acid such as a carboxylic acid or the like;
hydrogen halide such as hydrogen chloride or the like; or an alcohol or thiol.
A quaternary salt forming agent comprising a mixture of an acid and a hydrazine derivative not having active hydrogen or a tertiary amine At least one of these compounds may be used. In this case, at least a part (preferably the whole) of the active hydrogen-containing material (D) must be the hydrazine derivative.

Examples of the hydrazine derivative (C) having active hydrogen include the following:

(1) hydrazide compounds such as carbohydrazide, propionic acid hydrazide, salicylic acid hydrazide, adipic acid dihydrazide, sebacic acid dihydrazide, dodecanoic acid dihydrazide, isophthalic acid dihydrazide, thiocarbohydrazide, 4,4'-oxybisbenzenesulfonyl hydrazide, benzophenone hydrazide, and aminopolyacrylamide;

(2) pyrazole compounds such as pyrazole, 3,5-dimethylpyrazole, 3-methyl-5-pyrazolone, and 3-amino-5-methylpyrazole;

(3) triazole compounds such as 1,2,4-triazole, 3-amino-1,2,4-triazole, 4-amino-1,2,4-triazole, 3-mercapto-1,2,4-triazole, 5-amino-3-mercapto-1,2,4-triazole, 2,3-dihydro-3-oxo-1,2,4-triazole, 1H-benzotriazole, 1-hydroxybenzotriazole (monohydrate), 6-methyl-8-hydroxytriazolopyridazine, 6-phenyl-8-hydroxytriazolopyridazine, and 5-hydroxy-7-methyl-1,3,8-triazaindolizine;

(4) tetrazole compounds such as 5-phenyl-1,2,3,4-tetrazole and 5-mercapto-1-phenyl-1,2,3,4-tetrazole;

(5) thiadiazole compounds such as 5-amino-2-mercapto-1,3,4-thiadiazole, 2,5-dimercapto-1,3,4-thiaziazole; and (6) pyridazine compounds such as maleic acid hydrazide, 6-methyl-3-pyridazone, 4,5-dichloro-3-pyridazone, 4,5-dibromo-3-pyridazone, and 6-methyl-4,5-dihydro-3-pyridazone.

Among these derivatives, pyrazole compounds and triazole compounds, that have five-member rings, are particularly preferred.

These hydrazine derivatives can be used alone or in a mixture of two or more.

Typical examples of the amine compound having active hydrogen, which can be used as a part of the active hydrogen-containing material (D), include the following compounds:

(1) compounds modified to aldimine, ketimine, oxazoline, or imidazoline by reaction of a primary amino group of an amine compound having one secondary amino group and at least one primary amino group, such as diethylenetriamine, hydroxyethylaminoethylamine, ethylaminoethylamine, or methylaminopropylamine, with a keto compound such as a ketone, an aldehyde, or a carboxylic acid at a temperature of, for example, about 100° C. to 230° C.;

(2) secondary monoamines such as diethylamine, dibutylamine, diethanolamine, di-n- or -iso-propanolamine, N-methylethanolamine, and N-ethylethanolamine;

(3) secondary amine-containing compounds produced by addition reaction, e.g., Michael addition reaction, of monoalkanolamine such as monoethanolamine with dialkyl (meth)acrylamide; and (4) compounds produced by modifying a primary amino group of an alkanolamine such as monoethanolamine, neopentanolamine, 2-aminopropanol, 3-aminopropanol, or 2-hydroxy-2'-(aminopropoxy)ethyl ether to ketimine.

Since a hydrazine derivative not containing active hydrogen or a tertiary amine is unreactive to an epoxy group, the quaternary solt forming agent used as a part of the active hydrogen-containing material (D) comprises a mixture of the hydrazine derivative or tertiary mine and an acid in order enable reaction with an epoxy group. According to demand, the quaternary solt forming agent reacts with an epoxy group in the presence of water to form an epoxy-containing resin and a quaternary salt.

As the acid used for forming the quaternary solt forming agent, an organic acid such as acetic acid or lactic acid, an inorganic acid such as hydrochloric acid can be used. As the hydrazine derivative not containing active hydrogen and used for forming the quaternary solt forming agent, for example, 3,6-dichloropyridazine or the like can be used. Examples of the tertiary amine include N,N-dimethylethanolamine, triethylamine, trimethylamine, triisopropylamine, and methyldiethanolamine.

The reaction product (X) of reaction between the film forming organic resin (A) and the active hydrogen-containing material (D) including compounds partially or entirely comprising the active hydrogen-containing hydrazine derivative (C) is preferably produced by reaction of the film-forming organic resin (A) and the active hydrogen-containing material (D) at 10° C. to 300° C., preferably 50° C. to 150° C., for about 1 to 8 hours.

The reaction may be performed in the presence of a solvent, and the type of the solvent used is not particularly limited. Examples of the solvent include ketones such as acetone, methyl ethyl ketone, methyl isobutyl ketone, dibutyl ketone, and cyclohexanone; alcohols and ethers such as ethanol, butanol, 2-ethylhexyl alcohol, benzyl alcohol, ethylene glycol, ethylene glycol monoisopropyl ether, ethylene glycol monobutyl ether, ethylene glycol monohexyl ether, propylene glycol, propylene glycol monomethyl ether, diethylene glycol, diethylene glycol monoethyl ether, and diethylene glycol monobutyl ether; esters such as ethyl acetate, butyl acetate, and ethylene glycol monobutyl ether acetate; and aromatic hydrocarbons such as toluene and xylene. These solvents can be used alone or combination or two or more. Among these solvents, the ketone or ether solvents are particularly preferred from the viewpoint of compatibility with an epoxy resin and film-forming property.

The compounding ratio of the active hydrogen-containing material (D) partially or entirely comprising the active hydrogen-containing hydrazine derivative (C) to the film-forming organic resin (A) is preferably 0.5 to 20 parts by weight, more preferably 1.0 to 10 parts by weight, relatively to 100 parts by weight of the film-forming organic resin (A).

When the film-forming organic resin (A) is the epoxy-containing resin (E), the compounding ratio of the active hydrogen-containing material (D) to the epoxy-containing resin (E) is properly determined so that the ratio [number of active hydrogen atoms/number of epoxy groups] of the number of active hydrogen atoms in the active hydrogen-containing material (D) to the number of the epoxy groups in the epoxy-containing resin (E) is 0.01 to 10, more preferably 0.1 to 8, and most preferably 0.2 to 4, from the viewpoint of corrosion resistance.

The ratio of the active hydrogen-containing hydrazine derivative (C) in the active hydrogen-containing material (D) is preferably 10 mol % to 100 mol %, more preferably 30 mol % to 100 mol %, and most preferably 40 mol % to 100 mol %. When the ratio of the active hydrogen-containing hydrazine derivative (C) is 10 mol % or more, the sufficient rust-proofing function can be imparted to the organic film, thereby improving the rust-proofing effect as compared with a simple mixture of a film-forming organic resin and a hydrazine derivative.

To form the compact barrier film, preferably, the curing agent is mixed in the resin composition, and organic film is heat-cured.

Preferred examples of a curing method for forming a film of the resin composition include a curing method (1) utilizing urethanization reaction between isocyanate and hydroxyl groups of the resin (A), and a curing method (2) utilizing etherification reaction between an alkyl-etherified amino resin and hydroxyl groups of the resin (A), in which the alkyl-etherified amino resin is produced by partially or entirely reacting a methylol compound, which is produced by reaction of at least one compound selected from melamine, urea, and benzoguanamine with formaldehyde, with a monohydric alcohol having 1 to 5 carbon atoms. In particular, the urethanization reaction of an isocyanate and hydroxyl groups of the resin (A) is preferably used as main reaction.

The polyisocyanate compound used in the curing method (1) is an aliphatic, alicyclic (including heterocyclic) or aromatic isocyanate compound containing at least two isocyanate groups in its molecule, or a compound produced by partially reacting the isocyanate compound with a polyhydric alcohol. Examples of such a polyisocyanate compound include the following compounds:

(1) m- or p-phenylene diisocyanate, 2,4- or 2,6-tolylene diisocyanate, o- or p-xylylene diisocyanate, hexamethylene diisocyanate, dimmer acid diisocyanate, and isophorone diisocyanate; and (2) products of reaction between one or at least two of compounds (1) with a polyhydric alcohol (a dihydric alcohol such as ethylene glycol or propylene glycol; trihydric alcohol such as glycerine or trimethylolpropane; tetrahydric alcohol such as pentaerythritol; or hexahydric alcohol such as sorbitol or dipentaerythritol), the products each containing at least two isocyanate groups per molecule.

These polyisocyanate compounds can be used alone or in a mixture of two or more.

Examples of a compound which can be used as a protective agent (blocking agent) for the polyisocyanate compounds include the following:

(1) aliphatic monoalcohols such as methanol, ethanol, propanol, butanol, and octyl alcohol;

(2) monoethers of ethylene glycol and/or diethylene glycol, for example, methyl, ethyl, propyl (n- or iso), and butyl (n-, iso, or sec) monoethers; and (3) aromatic alcohols such as phenol and cresol; and (4) oximes such as acetoxime and methyl ethyl ketone oxime. At least one of these compounds is reacted with the polyisocyanate compound to produce a polyisocyanate compound stably protected at least at room temperature.

The polyisocyanate compound (F) is properly mixed as the curing agent with the film-forming organic resin (A) at a ratio (A)/(F) of 95/5 to 55/45 (weight ratio of involatile content), preferably (A)/(F) of 90/10 to 65/35. The polyisocyanate compound has water absorption, and thus a compounding ratio (A)/(F) of 55/45 or less is preferred for securing the adhesion of the organic film. When over coating is performed on the organic film, the unreacted polyisocyanate compound does not move to the coating to improve the curing and adhesion of the coating. From this viewpoint, the polyisocyanate compound (F) is preferably mixed at a ratio (A)/(F) or 55/45 or less.

Although the film-forming organic resin (A) is sufficiently cross-linked by adding the cross-linking agent (curing agent), a known accelerating catalyst is preferably used for increasing low-temperature crosslinking. Examples of the accelerating catalyst include N-ethylmorpholine, dibutyltin dilaurate, cobalt naphthenate, stannous chloride, zinc naphthenate, and bismuth nitrate.

For example, when an epoxy-containing organic resin is used as the film-forming organic resin (A), a known acryl, alkyd or polyester resin can be mixed with the epoxy-containing organic resin in order to improve some physical properties such as adhesion and the like.

Next, the rust-proofing additive (B) exhibiting the self-healing property will be described.

The types of the phosphate used as component (a) includes all types of salts including simple salts and double salts. The metal cation constituting the salt is not limited, and metal cation of any of zinc phosphate, magnesium phosphate, calcium phosphate, aluminum phosphate, and the like can be used. Also, the skeleton and the degree of condensation of the phosphoric acid ions are not limited, and any one of a normal salt, a dihydrogen salt, a monohydrogen salt, and a phosphite may be used. Examples of a normal salt include orthophosphates and all condensed phosphates such as polyphosphates.

Furthermore, when a calcium compound is added together with the phosphate as component (a), the corrosion resistance can be further improved. The calcium compound may be any one of calcium oxide, calcium hydroxide, and a calcium salt. These calcium compounds may be used alone or combination of two or more.

Examples of the calcium compound include, without limitation to, normal salts each containing only calcium as a cation, such as calcium silicate, calcium carbonate, and calcium phosphate; and double salts each containing calcium and a cation other than calcium, such as calcium-zinc phosphate and calcium-magnesium phosphate.

The Ca ion-exchanged silica used as component (b) comprises porous silica gel powder containing calcium ions fixed to the surfaces thereof, and it releases the Ca ions in a corrosive environment to form a precipitate film.

Any desired Ca ion-exchange silica can be used. The average particle diameter of the silica is 6 µm or less, and preferably 4 µm or less. For example, the silica having an average particle diameter of 2 to 4 µm can be used. The Ca ion-exchanged silica having an average particle diameter of 6 µm or less improves the corrosion resistance and the dispersion stability in the coating composition.

The Ca concentration in the Ca ion-exchanged silica is preferably 1 wt % or more, and more preferably 2 wt % to 8 wt %. With a Ca concentration of 1 wt %, the rust-proofing effect can be sufficiently obtained by Ca release. The surface area, pH, and oil absorption of the Ca ion-exchanged silica are not particularly limited.

Usable examples of the Ca ion-exchanged silica include SHIELDEX C303 (average particle diameter: 2.5 to 3.5 µm, Ca concentration: 3 wt %), SHIELDEX AC3 (average particle diameter: 2.3 to 3.1 µm, Ca concentration: 6 wt %), and SHIELDEX AC5 (average particle diameter: 3.8 to 5.2 µm, Ca concentration: 6 wt %) (trade names) produced by W. R. Grace & Co.; SHIELDEX (average particle diameter: 3 µm, Ca concentration: 6 to 8 wt %) and SHIELDEX SY710 (average particle diameter: 2.2 to 2.5 µm, Ca concentration: 6.6 to 7.5 wt %) (trade names) produced by Fuji Silysia Chemical Ltd.

The skeleton and the degree of condensation of the molybdate used as component (c) are not limited. Examples of the molybdate include orthomolybdates, paramolybdates, and metamolybdates. Types of the molybdate include all salts such as normal salts and double salts. Examples of double salts include phosphate molybdates.

The silicon oxide used as component (d) may be either colloidal silica or fumed silica. When an aqueous film-forming resin is used as the base, examples of the colloidal silica include Snowtex O, Snowtex N, Snowtex 20, Snowtex 30, Snowtex 40, Snowtex C, and Snowtex S (trade names) produced by Nissan Chemical Industries Ltd.; Cataloid S, Cataloid SI-350, Cataloid SI-40, Cataloid SA, and Cataloid SN (trade names) produced by Catalyst & Chemicals Co., Ltd.; and Aderite AT-20~50, Aderite AT-20N, Aderite AT-300, Aderite AT-330S, and Aderite AT20Q (trade names) produced by Asahi Denka Co. Ltd.

When a solvent-type film-forming resin is used as the base, examples of the colloidal silica include Organosilica Sol MA-ST-M, Organosilica Sol IPA-ST, Organosilica Sol EG-ST, Organosilica Sol E-ST-ZL, Organosilica Sol NPC-ST, Organosilica Sol DMAC-ST, Organosilica Sol DMAC-ST-ZL, Organosilica Sol XBA-ST, and Organosilica Sol MIBK-ST (trade names) produced by Nissan Chemical Industries Ltd.; and OSCAL-1132, OSCAL-1232, OSCAL-1332, OSCAL-1432, OSCAL-1532, OSCAL-1632, and OSCAL-1722 (trade names) produced by Catalyst & Chemicals Co., Ltd.

In particular, organic solvent dispersed silica sol has excellent dispersibility, and also has excellent corrosion resistance in comparison to fumed silica.

Examples of the fumed silica include AEROSIL R971, AEROSIL R812, AEROSIL R811, AEROSIL R974, AEROSIL R202, AEROSIL R805, AEROSIL 130, AEROSIL 200, AEROSIL 300, and AEROSIL 300CF (trade names) produced by Nihon Aerosil Co., Ltd.

Fine-particle silica contributes to the formation of a compact, stable corrosion product of zinc in a corrosive environment, and the corrosion product compactly formed on a plated surface can possibly suppress acceleration of corrosion.

From the viewpoint of corrosion resistance, the particle diameter of the fine-particle silica is preferably 5 to 50 nm, more preferably 5 to 20 nm, and most preferably 5 to 15 nm.

Examples of the organic compound used as component (e) include triazoles such as 1,2,4-triazole, 3-amino-1,2,4-triazole, 3-mercapto-1,2,4-triazole, 5-amino-3-mercapto-1, 2,4-triazole, and 1H-benzotriazole; thiols such as 1,3,5-triazine-2,4,6-trithiol and 2-mercaptobenzimidazole; thiadiazoles such as 5-amino-2-mercapto-1,3,4-thiadiazole and 2,5-dimercapto-1,3,4-thiadiazole; thiazoles such as 2-N, N-diethylthiobenzothiazole and 2-mercaptobenzothiazole; and thiurams such as tetraethylthiuram disulfide.

The total amount of the rust-proofing additive (total amount of at least one self-healing substance selected from components (a) to (e)) mixed in the organic film is preferably 1 to 100 parts by weight, more preferably 5 to 80 parts by weight, and most preferably 10 to 50 parts by weight in terms of solid content relative to 100 parts by weight of the resin (organic polymeric resin (A)). The solid content is defined as a solid at the time of mixing. When the compounding amount of the rust-proofing additive (B) is 1 part by weight or more, the corrosion resistance is improved. However, a compounding amount of 100 parts by weight or less is economical.

The dry thickness of the organic film must be 0.1 µm to 5 µm, preferably 0.3 µm to 3 µm, and more preferably 0.5 µm to 2 µm. When the thickness of the organic film is less than 0.1 µm, the corrosion resistance is unsatisfactory, while when the thickness exceeds 5 µm, the conductivity degrades.

The above-described organic film formed as the second layer film possibly has the following rust-proofing mechanism:

The organic polymeric resin (A) (preferably a thermosetting resin and more preferably an epoxy resin and/or a modified epoxy resin) having an OH group and/or a COOH group forms a compact barrier film by reaction with the cross-liking agent. The barrier film has the excellent ability to suppress permeation of a corrosion factor such as oxygen, and the OH group and/or COOH group in the molecule has a strong bonding force with the basis material, thereby possibly achieving excellent corrosion resistance (barrier function).

An appropriate amount of the rust-proofing additive (B) (self-healing substance) is mixed in the organic film comprising the specified organic polymeric resin. As a result, particularly, the excellent rust-proofing ability (self-healing effect) can be obtained. The possible rust-proofing mechanism realized by mixing the components (a) to (e) in the specified organic film is as follows:

Component (a) is dissociated into phosphoric acid ions by hydrolysis in a corrosive environment and forms a protective film due to complex forming reaction with the eluted metal.

When cation such as Na ions enters the film in a corrosive environment, the Ca ions on the surfaces of the silica used as component (b) are released by an ion exchange function. Furthermore, when OH ions are produced by cathode reaction in a corrosive environment to increase the pH near the plating interface, the Ca ions released from the Ca ion-exchanged silica precipitate as $Ca(OH)_2$ near the plating interface to seal defects as a compact, slightly soluble product, thereby preventing corrosion reaction. The eluted zinc ions are exchanged with the Ca ions and fixed to the silica surfaces.

Component (c) exhibits the self-healing effect due to a passivating effect. Namely, component (c) forms a compact oxide film on the surface of the plating film together with dissolved oxygen in a corrosive environment, and the oxide film seals the corrosion origin to suppress corrosion reaction.

Component (d) contributes to the formation of a compact and stable corrosion product of zinc in a corrosive environment, and the corrosion product compactly formed on the surface suppresses acceleration of corrosion.

Furthermore, component (e) exhibits the self-healing property due to an adsorption effect. Namely, zinc and aluminum eluted by corrosion are adsorbed on a nitrogen- or sulfur-containing polar group in component (e) to form an inert film, and the inert film seals the corrosion origin to suppress corrosion reaction.

Even when components (a) to (e) are mixed in a general organic film, the rust-proofing effect can be obtained to some extent. However, as in the present invention, when components (a) to (e) as the self-healing substances are mixed in the organic film having excellent barrier property and comprising the specified organic polymeric resin, both effects (barrier effect and self-healing effect) may be combined to exhibit the excellent rust-proofing effect.

Furthermore, when a calcium compound is added together with component (a), the calcium compound is eluted in preference to the plating metal in a corrosive environment, and thus causes complex formation reaction with phosphoric acid ions to form a compact, slightly soluble protective film without using elusion of the plating metal as a trigger, thereby suppressing corrosion reaction.

When at least two of components (a) to (e) is added, the corrosion suppressing functions of the components are combined to exhibit the more excellent corrosion resistance.

In addition to the rust-proofing additive, the organic film may contain, as a corrosion inhibitor, at least one of other oxide fine particles (for example, aluminum oxide, zirconium oxide, titanium oxide, cerium oxide, antimony oxide, and the like); phosphomolybdates (for example, aluminum phosphomolybdate, and the like); organic phosphoric acid and its salts (for example, phytic acid, phytates, phosphonic acid, phosphonates, and metal salts, alkali metal salts, and alkali earth metal salts thereof), organic inhibitors (for example, hydrazine derivatives, thiol compounds, dithiocarbamates, and the like).

Furthermore, a solid lubricant can be mixed in the organic film in order to improve the workability of the film according to demand.

Examples of the solid lubricant include the following. These compounds may be used alone or in combination of two or more.

(1) Polyolefin wax and paraffin wax: for example, polyethylene wax, synthetic paraffin, natural paraffin, micro wax, and chlorinated hydrocarbons.

(2) Fluororesin fine particles: for example, polyfluoroethylene resin (polytetrafluoroethylene resin), polyvinyl fluoride resin, and polyvinylidene fluoride resin.

Other examples include fatty acid amide compounds (for example, stearic amide, palmitic amide, methylenebisstearamide, ethylenebisstearamide, oleic amide, erucic amide, alkylene bis-fatty acid amides, and the like); metal soaps (for example, calcium stearate, lead stearate, calcium laurate, calcium palmitate, and the like); metal sulfides (for example, molybdenum disulfide, tungsten disulfide, and the like); graphite; graphite fluoride; boron nitride; polyalkylene glycol; alkali metal sulfates; and the like.

Among these solid lubricants, polyethylene wax, fluororesin fine particles (particularly, polytetrafluoroethylene resin fine particles) are particularly preferred.

Examples of the polyethylene wax include Ceridust 9615A, Ceridust 3715, Ceridust 3620, and Ceridust 3910 (trade names) produced by Hoechst Japan Ltd.; Sanwax 131-P and Sanwax 161-P (trade names) produced by Sanyo Chemical Industries, Ltd; and Chemipearl W-100, Chemipearl W-200, Chemipearl W-500, Chemipearl W-800, and Chemipearl W-950 (trade names) produced by Mitsui Petrochemical Industries, Ltd.

As the fluororesin fine particles, tetrafluoroethylene fine particles are most preferred. Preferred examples of the fine particles include Lubron L-2 and Lubron L-5 (trade names) produced by Daikin Industries, Ltd.; MP1100 and MP1200 (trade names) produced by Mitsui-Dupont Co., Ltd.; Fluon Dispersion AD1, Fluon Dispersion AD2, Fluon L141J, Fluon L150J, and Fluon L155J (trade names) produced by Asahi ICI Fluoropolymers Co., Ltd.

In particular, the excellent lubricating effect can be expected by combination of the polyolefin wax and tetrafluoroethylene fine particles.

The amount of the solid lubricant mixed in the organic film is 1 to 80 parts by weight, and preferably 3 to 40 parts by weight, relative to 100 parts by weight of the resin (organic polymeric resin (A)). When the amount of the solid lubricant mixed is 1 part by weigh or more, the sufficient lubricating effect can be obtained, while when the amount of the solid lubricant mixed is 80 parts by weight or less, the paintability is desirably improved.

According to demand, the organic film may further contain as an additive at least one of an organic coloring pigment (for example, a condensed polycyclic organic pigment, a phthalocyanine organic pigment, or the like), a coloring dye (for example, an organic solvent-soluble azo dye, a water-soluble azo metal dye, or the like), an inorganic pigment (for example, titanium oxide or the like), a chelating agent (for example, thiol or the like), a conductive pigment (for example, a metal powder of zinc, aluminum, nickel, or the like, iron phosphide, antimony-doped tin oxide, or the like), a coupling agent (for example, a silane coupling agent, a titanium coupling agent, or the like), a melamine-cyanuric acid adduct; and the like.

The surface-treated steel sheet is produced by coating the surfaces of a steel sheet having a zinc-containing or aluminum-containing coating with a treatment solution containing the components for the composite oxide film, heat-drying the steel sheet, coating the steel sheet with a coating composition containing the specified organic polymeric resin (A) and the rust-proofing additive (B) (preferably as main components), and further containing the solid lubricant and the like according to demand, and then heat-drying the coated steel sheet.

The surfaces of the plated-steel sheet can be previously subjected to alkali degreasing and pre-treatment such as surface control treatment for further improving adhesion and corrosion resistance before the coating with the treatment solution according to demand.

In order to treat the surface of the plated steel sheet having the zinc-containing coating or aluminum-containing coating with the treatment solution to form the composite oxide film (first layer film), the treatment solution preferably contains the following components:

(α) silica;

(β) phosphoric acid and/or a phosphoric acid compound;

(γ) at least one selected from the group consisting of metal ions of Mg, Mn, and Al, water-soluble ions containing at least one of the metals, compounds containing at least one of the metals, and complex compounds containing at least one of the metals; and (δ) a tetravalent vanadium compound.

The treatment solution (aqueous) further contains the additives (an organic resin component, iron group metal ions, a corrosion inhibitor, and other additives) according to demand. After the treatment, the plated steel sheet is preferably dried by heating.

As a method for coating the steel sheet surfaces with the treatment solution for the first layer film, any one of a coating method, a dipping method, and a spray method may be used. The coating method may be performed with any coating means such as a roll coater (three-roll system or two-roll system, or the like), a squeeze coater, a die coater, or the like. After the coating treatment with a squeeze coater, the dipping treatment, or the spray treatment, control of the coating amount, and uniformalization of appearance and thickness can be performed by an air knife method or a roll squeeze method. Although the temperature of the treatment solution is not particularly limited, the temperature is properly room temperature to about 60° C. A temperature of less than room temperature is uneconomical because a cooling apparatus or the like is required, while a temperature of over 60° C. causes difficulty in control of the treatment solution because the solvent easily evaporates.

As described above, drying is performed by heating without water-washing after coating with the treatment solution. The treatment solution used in the present invention forms a slightly soluble salt by reaction with the plated steel sheet used as the base, and thus water-washing may be performed after the treatment. The coated treatment solution is dried by any desired heating method. For example, means such as a dryer, a hot-air furnace, a high-frequency induction heating furnace, an infrared furnace, or the like may be used. From the viewpoint of corrosion resistance, the high-frequency induction heating furnace is preferred. The heat-drying is preferably performed at a reachable sheet temperature in a range of 50° C. to 300° C., more preferably 80° C. to 200° C., and most preferably 80° C. to 160° C. When the heat-drying temperature is 50° C. or more, the sufficient corrosion resistance can be obtained. However, a heat-drying temperature of 300° C. or less is economical.

As described above, the composite oxide film is formed as the first layer film on a surface of the plated steel sheet having a zinc-containing or aluminum-containing coating. Then, the coating composition for forming the second layer film (organic film) is coated on the first layer film. As the method for coating the coating composition, any one of a coating method, a dipping method, and a spray method may be used. The coating method may be performed with any coating means such as a roll coater (three-roll system or two-roll system, or the like), a squeeze coater, a die coater, or the like. After the coating treatment with a squeeze coater, the dipping treatment, or the spray treatment, control of the coating amount and uniformalization of appearance and thickness can be performed by an air knife method or a roll squeeze method.

After coating with the coating composition, drying is performed by heating without water-washing. However, water-washing may be performed after coating of the coating composition. Heat-drying may be performed with means such as a dryer, a hot-air furnace, a high-frequency induction heating furnace, an infrared furnace, or the like. From the viewpoint of corrosion resistance, the high-frequency induction heating furnace is preferred. The drying by heating is preferably performed at a reachable sheet temperature in a range of 50° C. to 350° C., and more preferably 80° C. to 250° C. When the heat-drying temperature is 50° C. or more, the sufficient corrosion resistance can be obtained. However, a heat-drying temperature of 350° C. or less is economical.

The above-descried films are formed on one or both of the surfaces of the steel sheet. Therefore, the forms of the steel sheet of the present invention include the following:

(1) One side: plating film-composite oxide film-organic film, the other side: plating film (2) One side: plating film-composite oxide film-organic film, the other side: plating film-known phosphate-treated film (3) Both sides: plating film-composite oxide film-organic film (4) One side: plating film-composite oxide film-organic film, the other side: plating film-composite oxide film (5) One side: plating film-composite oxide film-organic film, the other aide: plating film-organic film

EXAMPLES

In order to form a first layer film, silica (α) shown in Table 1, phosphoric acid and/or phosphoric acid compound (β) shown in Table 2, a Mn phosphate, Mg phosphate, or Al phosphate as a metal compound (γ) containing a metal component shown in Table 3, and a tetravalent vanadium compound (δ) shown in Table 4 were appropriately mixed with water to prepare a treatment solution. In order to form a second layer film, the resin (A) shown in Table 5 and the rust-proofing additive (B) shown in Table 6 were appropriately mixed to prepare a coating composition.

Each of the D-modified resin A' and D-modified resin A" shown in Table 5 was synthesized by the method below.

[D-modified Resin A']

In a four-necked flask, 1870 parts of EP828 (produced by Yuka Shell Epoxy Co. Ltd., epoxy equivalent 187), 912 parts of bisphenol A, 2 parts of tetraethylammonium bromide, and 300 parts of methyl isobutyl ketone were charged, and the resultant mixture was heated to 140° C., followed by reaction for 4 hours. As a result, an epoxy resin having an epoxy equivalent 1391 and a solid content of 90% was obtained. To the epoxy resin, 1500 parts of ethylene glycol monobutyl ether was added, and then the resulting mixture was cooled to 100° C. Then, 96 parts of 3,5-dimethylpyrozole (molecular weight 96) and 129 parts of dibutylamine (molecular weight 129) were added to the mixture, followed by reaction for 6 hours until the epoxy groups disappeared. Then, 205 parts of methyl isobutyl ketone was added under cooling to obtain pyrazole-modified epoxy resin having a solid content of 60%. The pyrazole-modified epoxy resin is referred to as "D-modified resin A'". The resin (A') corresponds to the product (X) of reaction between the film forming organic resin (A) and the active hydrogen-containing material (D) containing 50 mol % of the hydrazine derivative (C) having active hydrogen.

[D-modified Resin A"]

In a four-necked flask, 4000 parts of EP1007 (produced by Yuka Shell Epoxy Co. Ltd., epoxy equivalent 2000) and 2239 parts of ethylene glycol monobutyl ether were charged, and the resultant mixture was heated to 120° C. to completely dissolve the epoxy resin over 1 hour. The resultant solution was cooled to 100° C., and 168 parts of 3-amino-1,2,4-triazole (molecular weight 84) was added to the solution, followed by reaction for 6 hours until the epoxy groups disappeared. Then, 540 parts of methyl isobutyl ketone was added to the reaction solution under cooling to obtain triazole-modified epoxy resin having a solid content of 60%. The triazole-modified epoxy resin is referred to as "D-modified resin A'". The resin (A") corresponds to the product (X) of reaction between the film-forming organic resin (A) and the active hydrogen-containing material (D) containing 100 mol % of the hydrazine derivative (C) having active hydrogen.

As a raw material sheet to be treated, each of the plated steel sheets shown in Table 7 was used. The surfaces of the plated steel sheets were subjected to alkali degreasing and then washed with water and dried. Then, the treatment solution for forming the first layer film was coated, and dried with a high-frequency induction heating furnace so that the reachable sheet temperature was 140° C. Next, the coating composition for forming the second layer film was coated, dried with a high-frequency induction heating furnace so that the reachable sheet temperature was 140° C., to form surface-treated steel sheets of examples of this invention and comparative examples. The thickness of each of the first layer film and the second layer film was controlled by controlling the residue of the film composition after heating, the treatment time, or the like.

The types of the plated steel sheets and the compositions of the first layer film are shown in Tables 8-1, 8-2 and 8-3, and the compositions of the second layer film are shown in Tables 9-1, 9-2, and 9-3. The evaluation results of qualities (coating appearance, corrosion resistance, and conductivity) of the surface-treated steel sheets are shown in Tables 10-1, 10-2, and 10-3.

The measurement and evaluation methods of each quality were as follows:

(1) Coating Appearance after Wetting Test

Each of samples was allowed to stand at 80° C. and a relative humidity of 98% for 1 day, and then the coating appearance was visually evaluated on the basis of the following criteria:

A: Neither coloring nor discoloration (the same as before the wetting test)
   B: Slight coloring which could be recognized when observed obliquely
   B-: Obvious coloring and discoloration with an area ratio of less than 5%
   C: Obvious coloring and discoloration with an area ratio of 5% to less than 20%
   D: Obvious coloring and discoloration with an area ratio of 20% or more (2) Resistance to White Rust Each sample was subjected to a salt-water spray test (JIS-Z-2371), and the area ratio of white rust was evaluated after a predetermined time on the basis of the following criteria:

A: Area ratio of white rust of less than 5%
   B: Area ratio of white rust of 5% to less than 10%
   B-: Area ratio of white rust of 10% to less than 25%
   C: Area ratio of white rust of 25% to less than 50%
   D: Area ratio of white rust of 50% to 100%

(3) Conductivity

The interlayer insulation resistance was measured according to JIS C2550. Evaluation was performed on the basis of the following criteria:

A: less than 3 $\Omega cm^2$/sheet
   B: 3 to 5 $\Omega cm^2$/sheet
   C: over 5 $\Omega cm^2$/sheet Tables 10-1, 10-2, and 10-3 indicate that the examples of this invention are excellent in coating appearance after the wetting test, resistance to white rust (corrosion resistance), and conductivity. On the other hand, the comparative examples are inferior to the examples of this invention in any one of coating appearance after the wetting test, resistance to white rust (corrosion resistance), and conductivity.

As described above, the surface-treated steel sheets exhibit excellent corrosion resistance even when coatings do not contain a pollution control substance such as hexavalent chromium, and also have excellent conductivity and coating appearance.

TABLE 1

| No. | (α) Silica |
|---|---|
| 1 | Snowtex OS |
| 2 | Snowtex O |
| 3 | AEROSIL 200 |
| 4 | AEROSIL 300 |

TABLE 2

| No. | (β) Phosphoric acid/ phosphoric acid compound |
|---|---|
| 1 | Orthotriphosphoric acid |
| 2 | Pyrophosphoric acid |

TABLE 3

| No. | (γ) Metal component in metal compound |
|---|---|
| 1 | Mg |
| 2 | Mn |
| 3 | Al |

TABLE 4

| No. | (δ) Vanadium compound | Valency |
|---|---|---|
| 1 | $VOSO_4$ | 4 |
| 2 | $VCl_4$ | 4 |
| 3 | $V_2O_4$ | 4 |
| 4 | $NH_4VO_3$ | 5 |
| 5 | $VCl_3$ | 3 |
| 6 | VO | 2 |

TABLE 5

| No. | Organic resin (A) |
|---|---|
| 1 | Epoxy resin |
| 2 | Urethane resin |
| 3 | D-modified resin A' |
| 4 | D-modified resin A" |

TABLE 6

| | | Rust-proofing additive (B) | | | |
|---|---|---|---|---|---|
| No. | (a) Phosphate | (b) Ca ion-exchanged silica | (c) Molybdate | (d) Silicon oxide | (e) Triazoles, thiols, thiadiazoles, thiazoles, or thiurams |
| 1 | Zinc phosphate | — | — | — | — |
| 2 | — | Ca ion-exchanged silica | — | — | — |
| 3 | — | — | Al phosphate molybdate | — | — |
| 4 | — | — | — | Colloidal silica | — |
| 5 | — | — | — | — | Tetraethylthiuram disulfide |

TABLE 7

| No. | Plated steel sheet | Coating weight* (g/m$^2$) |
|---|---|---|
| 1 | Electrogalvanized steel sheet | 20 |
| 2 | Hot-dip galvanized steel sheet | 60 |
| 3 | Alloying hot-dip galvanized steel sheet (Fe: 10 wt %) | 60 |
| 4 | Zn—Ni alloy plated steel sheet (Ni: 12 wt %) | 20 |
| 5 | Zn—Co alloy plated steel sheet (Co: 0.5 wt %) | 20 |
| 6 | Zn—Cr alloy plated steel sheet (Cr: 12 wt %) | 20 |
| 7 | Hot-dip Zn—Al—Mg alloy plated steel sheet (Al: 5 wt %, Mg: 0.5 wt %) | 90 |
| 8 | Electrically Zn—SiO$_2$ dispersion-plated steel sheet | 20 |
| 9 | Zn—Al—Mg alloy plated steel sheet (Al: 6 wt %, Mg: 3 wt %) | 120 |
| 10 | Hot-dip Zn—Mg alloy plated steel sheet (Mg: 0.5 wt %) | 150 |

*Coating weight on each side

TABLE 8-1

| | | | First layer film | | | | | | |
|---|---|---|---|---|---|---|---|---|---|
| | | | (α) Silica | | (β) Phosphoric acid/phosphoric acid compound | | (γ) Metal component | | (δ) Vanadium compound | |
| Section | No. | Plated steel sheet *1 | Type *2 | Coating weight in terms of SiO$^2$ (mg/m$^2$) | Type *3 | Coating weight in terms of P (mg/m$^2$) | Type *4 | Coating weight in terms of Mn, Al or Mg (mg/m$^2$) | Type *5 | Coating weight in terms of V (mg/m$^2$) |
| Comp. Example | 1 | 1 | 1 | 100 | 1 | 50 | 1 | 25 | 3 | 0 |
| Example | 2 | 1 | 1 | 100 | 1 | 50 | 1 | 25 | 3 | 10 |
| Example | 3 | 1 | 1 | 100 | 1 | 50 | 1 | 25 | 3 | 30 |
| Example | 4 | 1 | 1 | 100 | 1 | 50 | 1 | 25 | 3 | 50 |
| Example | 5 | 1 | 1 | 100 | 1 | 50 | 1 | 25 | 3 | 70 |
| Example | 6 | 1 | 1 | 100 | 1 | 50 | 1 | 25 | 1 | 10 |
| Example | 7 | 1 | 1 | 100 | 1 | 50 | 1 | 25 | 2 | 10 |
| Comp. Example | 8 | 1 | 1 | 100 | 1 | 50 | 1 | 25 | 4 | 10 |
| Comp. Example | 9 | 1 | 1 | 100 | 1 | 50 | 1 | 25 | 5 | 10 |
| Comp. Example | 10 | 1 | 1 | 100 | 1 | 50 | 1 | 25 | 6 | 10 |
| Example | 11 | 2 | 1 | 100 | 1 | 50 | 1 | 25 | 3 | 10 |
| Example | 12 | 3 | 1 | 100 | 1 | 50 | 1 | 25 | 3 | 10 |
| Example | 13 | 4 | 1 | 100 | 1 | 50 | 1 | 25 | 3 | 10 |
| Example | 14 | 5 | 1 | 100 | 1 | 50 | 1 | 25 | 3 | 10 |
| Example | 15 | 6 | 1 | 100 | 1 | 50 | 1 | 25 | 3 | 10 |
| Example | 16 | 7 | 1 | 100 | 1 | 50 | 1 | 25 | 3 | 10 |
| Example | 17 | 8 | 1 | 100 | 1 | 50 | 1 | 25 | 3 | 10 |
| Example | 18 | 9 | 1 | 100 | 1 | 50 | 1 | 25 | 3 | 10 |

*1: Plated steel sheet No. shown in Table 7
*2: Silica No. shown in Table 1
*3: Phosphoric acid/phosphoric acid compound No. shown in Table 2
*4: Metal component No. shown in Table 3
*5: Vanadium compound No. shown in Table 4

TABLE 8-2

| | | | (α) Silica | | (β) Phosphoric acid/phosphoric acid compound | | (γ) Metal component | | (δ) Vanadium compound | |
|---|---|---|---|---|---|---|---|---|---|---|
| | | | | | | | | | | |
| Section | No. | Plated steel sheet *1 | Type *2 | Coating weight in terms of $SiO_2$ (mg/m$^2$) | Type *3 | Coating weight in terms of P (mg/m$^2$) | Type *4 | Coating weight in terms of Mn, Al or Mg (mg/m$^2$) | Type *5 | Coating weight in terms of V (mg/m$^2$) |
| Example | 19 | 10 | 1 | 100 | 1 | 50 | 1 | 25 | 3 | 10 |
| Comp. Example | 20 | 1 | 1 | 0 | 1 | 50 | 1 | 25 | 3 | 10 |
| Example | 21 | 1 | 1 | 500 | 1 | 50 | 1 | 25 | 3 | 10 |
| Example | 22 | 1 | 1 | 2000 | 1 | 50 | 1 | 25 | 3 | 10 |
| Comp. Example | 23 | 1 | 1 | 2500 | 1 | 50 | 1 | 25 | 3 | 10 |
| Example | 24 | 1 | 2 | 100 | 1 | 50 | 1 | 25 | 3 | 10 |
| Example | 25 | 1 | 3 | 100 | 1 | 50 | 1 | 25 | 3 | 10 |
| Example | 26 | 1 | 4 | 100 | 1 | 50 | 1 | 25 | 3 | 10 |
| Comp. Example | 27 | 1 | 1 | 100 | 1 | 0 | 1 | 25 | 3 | 10 |
| Example | 28 | 1 | 1 | 100 | 1 | 250 | 1 | 25 | 3 | 10 |
| Example | 29 | 1 | 1 | 100 | 1 | 800 | 1 | 25 | 3 | 10 |
| Comp. Example | 30 | 1 | 1 | 100 | 1 | 1100 | 1 | 25 | 3 | 10 |
| Example | 31 | 1 | 1 | 100 | 2 | 50 | 1 | 25 | 3 | 10 |
| Comp. Example | 32 | 1 | 1 | 100 | 1 | 50 | 1 | 0 | 3 | 10 |
| Example | 33 | 1 | 1 | 100 | 1 | 50 | 1 | 250 | 3 | 10 |
| Example | 34 | 1 | 1 | 100 | 1 | 50 | 1 | 600 | 3 | 10 |
| Comp. Example | 35 | 1 | 1 | 100 | 1 | 50 | 1 | 900 | 3 | 10 |
| Example | 36 | 1 | 1 | 100 | 1 | 50 | 2 | 25 | 3 | 10 |

*1: Plated steel sheet No. shown in Table 7
*2: Silica No. shown in Table 1
*3: Phosphoric acid/phosphoric acid compound No. shown in Table 2
*4: Metal component No. shown in Table 3
*5: Vanadium compound No. shown in Table 4

TABLE 8-3

| | | | (α) Silica | | (β) Phosphoric acid/phosphoric acid compound | | (γ) Metal component | | (δ) Vanadium compound | |
|---|---|---|---|---|---|---|---|---|---|---|
| | | | | | | | | | | |
| Section | No. | Plated steel sheet *1 | Type *2 | Coating weight in terms of $SiO_2$ (mg/m$^2$) | Type *3 | Coating weight in terms of P (mg/m$^2$) | Type *4 | Coating weight in terms of Mn, Al or Mg (mg/m$^2$) | Type *5 | Coating weight in terms of V (mg/m$^2$) |
| Example | 37 | 1 | 1 | 100 | 1 | 50 | 3 | 25 | 3 | 10 |
| Example | 38 | 1 | 1 | 100 | 1 | 50 | 1 | 25 | 3 | 10 |
| Example | 39 | 1 | 1 | 100 | 1 | 50 | 1 | 25 | 3 | 10 |
| Example | 40 | 1 | 1 | 100 | 1 | 50 | 1 | 25 | 3 | 10 |
| Example | 41 | 1 | 1 | 100 | 1 | 50 | 1 | 25 | 3 | 10 |
| Example | 42 | 1 | 1 | 100 | 1 | 50 | 1 | 25 | 3 | 10 |
| Example | 43 | 1 | 1 | 100 | 1 | 50 | 1 | 25 | 3 | 10 |
| Example | 44 | 1 | 1 | 100 | 1 | 50 | 1 | 25 | 3 | 10 |
| Comp. Example | 45 | 1 | 1 | 100 | 1 | 50 | 1 | 25 | 3 | 10 |
| Example | 46 | 1 | 1 | 100 | 1 | 50 | 1 | 25 | 3 | 10 |
| Example | 47 | 1 | 1 | 100 | 1 | 50 | 1 | 25 | 3 | 10 |
| Comp. Example | 48 | 1 | 1 | 100 | 1 | 50 | 1 | 25 | 3 | 10 |
| Comp. Example | 49 | 1 | 1 | 100 | 1 | 50 | 1 | 25 | 3 | 10 |
| Example | 50 | 1 | 1 | 100 | 1 | 50 | 1 | 25 | 3 | 10 |
| Example | 51 | 1 | 1 | 100 | 1 | 50 | 1 | 25 | 3 | 10 |
| Example | 52 | 1 | 1 | 100 | 1 | 50 | 1 | 25 | 3 | 10 |
| Example | 53 | 1 | 1 | 100 | 1 | 50 | 1 | 25 | 3 | 10 |
| Comp. Example | 54 | 1 | 1 | 100 | 1 | 50 | 1 | 25 | 3 | 10 |

*1: Plated steel sheet No. shown in Table 7
*2: Silica No. shown in Table 1
*3: Phosphoric acid/phosphoric acid compound No. shown in Table 2
*4: Metal component No. shown in Table 3
*5: Vanadium compound No. shown in Table 4

TABLE 9-1

| | | Second layer film | | | |
|---|---|---|---|---|---|
| Section | No. | Organic resin (A) *6 | Rust-proofing additive (B) *7 | Compounding ratio (A)/(B) *8 | Thickness (μm) |
| Comp. Example | 1 | 3 | 2 | 100:30 | 1.0 |
| Example | 2 | 3 | 2 | 100:30 | 1.0 |
| Example | 3 | 3 | 2 | 100:30 | 1.0 |
| Example | 4 | 3 | 2 | 100:30 | 1.0 |
| Example | 5 | 3 | 2 | 100:30 | 1.0 |
| Example | 6 | 3 | 2 | 100:30 | 1.0 |
| Example | 7 | 3 | 2 | 100:30 | 1.0 |
| Comp. Example | 8 | 3 | 2 | 100:30 | 1.0 |
| Comp. Example | 9 | 3 | 2 | 100:30 | 1.0 |
| Comp. Example | 10 | 3 | 2 | 100:30 | 1.0 |
| Example | 11 | 3 | 2 | 100:30 | 1.0 |
| Example | 12 | 3 | 2 | 100:30 | 1.0 |
| Example | 13 | 3 | 2 | 100:30 | 1.0 |
| Example | 14 | 3 | 2 | 100:30 | 1.0 |
| Example | 15 | 3 | 2 | 100:30 | 1.0 |
| Example | 16 | 3 | 2 | 100:30 | 1.0 |
| Example | 17 | 3 | 2 | 100:30 | 1.0 |
| Example | 18 | 3 | 2 | 100:30 | 1.0 |

*6: Organic resin No. shown in Table 5
*7: Rust-proofing additive No. shown in Table 6
*8: Weight ratio

TABLE 9-2

| | | Second layer film | | | |
|---|---|---|---|---|---|
| Section | No. | Organic resin (A) *6 | Rust-proofing additive (B) *7 | Compounding ratio (A)/(B) *8 | Thickness (μm) |
| Example | 19 | 3 | 2 | 100:30 | 1.0 |
| Comp. Example | 20 | 3 | 2 | 100:30 | 1.0 |
| Example | 21 | 3 | 2 | 100:30 | 1.0 |
| Example | 22 | 3 | 2 | 100:30 | 1.0 |
| Comp. Example | 23 | 3 | 2 | 100:30 | 1.0 |
| Example | 24 | 3 | 2 | 100:30 | 1.0 |
| Example | 25 | 3 | 2 | 100:30 | 1.0 |
| Example | 26 | 3 | 2 | 100:30 | 1.0 |
| Comp. Example | 27 | 3 | 2 | 100:30 | 1.0 |
| Example | 28 | 3 | 2 | 100:30 | 1.0 |
| Example | 29 | 3 | 2 | 100:30 | 1.0 |
| Comp. Example | 30 | 3 | 2 | 100:30 | 1.0 |
| Example | 31 | 3 | 2 | 100:30 | 1.0 |
| Comp. Example | 32 | 3 | 2 | 100:30 | 1.0 |
| Example | 33 | 3 | 2 | 100:30 | 1.0 |
| Example | 34 | 3 | 2 | 100:30 | 1.0 |
| Comp. Example | 35 | 3 | 2 | 100:30 | 1.0 |
| Example | 36 | 3 | 2 | 100:30 | 1.0 |

*6: Organic resin No. shown in Table 5
*7: Rust-proofing additive No. shown in Table 6
*8: Weight ratio

TABLE 9-3

| | | Second layer film | | | |
|---|---|---|---|---|---|
| Section | No. | Organic resin (A) *6 | Rust-proofing additive (B) *7 | Compounding ratio (A)/(B) *8 | Thickness (μm) |
| Example | 37 | 3 | 2 | 100:30 | 1.0 |
| Example | 38 | 4 | 2 | 100:30 | 1.0 |
| Example | 39 | 1 | 2 | 100:30 | 1.0 |
| Example | 40 | 2 | 2 | 100:30 | 1.0 |
| Example | 41 | 3 | 1 | 100:30 | 1.0 |
| Example | 42 | 3 | 3 | 100:30 | 1.0 |
| Example | 43 | 3 | 4 | 100:30 | 1.0 |
| Example | 44 | 3 | 5 | 100:30 | 1.0 |
| Comp. Example | 45 | 3 | — | 100:0 | 1.0 |
| Example | 46 | 3 | 2 | 100:70 | 1.0 |
| Example | 47 | 3 | 2 | 100:100 | 1.0 |
| Comp. Example | 48 | 3 | 2 | 100:150 | 1.0 |
| Comp. Example | 49 | — | — | — | — |
| Example | 50 | 3 | 2 | 100:30 | 0.1 |
| Example | 51 | 3 | 2 | 100:30 | 0.5 |
| Example | 52 | 3 | 2 | 100:30 | 3.0 |
| Example | 53 | 3 | 2 | 100:30 | 5.0 |
| Comp. Example | 54 | 3 | 2 | 100:30 | 10.0 |

*6: Organic resin No. shown in Table 5
*7: Rust-proofing additive No. shown in Table 6
*8: Weight ratio

TABLE 10-1

| | | Performance | | | | |
|---|---|---|---|---|---|---|
| Section | No. | Film appearance | Resistance to white rust after 140 hr | Resistance to white rust after 200 hr | Resistance to white rust after 260 hr | Conductivity |
| Comp. Example | 1 | A | C | D | D | A |
| Example | 2 | A | A | A | A | A |
| Example | 3 | B | A | A | A | A |
| Example | 4 | B- | A | A | A | A |
| Example | 5 | C | A | A | A | A |
| Example | 6 | B | A | A | B | A |
| Example | 7 | B | A | A | B | A |
| Comp. Example | 8 | B | B | B- | C | A |
| Comp. Example | 9 | B | B- | C | C | A |
| Comp. Example | 10 | B | B- | C | C | A |
| Example | 11 | A | A | A | A | A |
| Example | 12 | A | A | A | A | A |
| Example | 13 | A | A | A | A | A |
| Example | 14 | A | A | A | A | A |
| Example | 15 | A | A | A | A | A |
| Example | 16 | A | A | A | A | A |
| Example | 17 | A | A | A | A | A |
| Example | 18 | A | A | A | A | A |

TABLE 10-2

| | | Performance | | | | |
|---|---|---|---|---|---|---|
| Section | No. | Film appearance | Resistance to white rust after 140 hr | Resistance to white rust after 200 hr | Resistance to white rust after 260 hr | Conductivity |
| Example | 19 | A | A | A | A | A |
| Comp. Example | 20 | A | C | D | D | A |
| Example | 21 | B | A | A | A | A |
| Example | 22 | B- | A | A | A | A |
| Comp. Example | 23 | C | A | A | A | A |
| Example | 24 | A | A | A | A | A |
| Example | 25 | A | A | A | A | A |

TABLE 10-2-continued

| Section | No. | Film appearance | Resistance to white rust after 140 hr | Resistance to white rust after 200 hr | Resistance to white rust after 260 hr | Conductivity |
|---|---|---|---|---|---|---|
| Example | 26 | A | A | A | A | A |
| Comp. Example | 27 | A | D | D | D | A |
| Example | 28 | A | A | A | B | A |
| Example | 29 | A | A | B | B- | A |
| Comp. Example | 30 | A | B | B- | C | A |
| Example | 31 | A | A | A | A | A |
| Comp. Example | 32 | A | C | D | D | A |
| Example | 33 | B | A | A | B | A |
| Example | 34 | B- | A | B | B- | A |
| Comp. Example | 35 | C | B | B- | C | A |
| Example | 36 | A | A | A | A | A |

TABLE 10-3

| Section | No. | Film appearance | Resistance to white rust after 140 hr | Resistance to white rust after 200 hr | Resistance to white rust after 260 hr | Conductivity |
|---|---|---|---|---|---|---|
| Example | 37 | A | A | A | A | A |
| Example | 38 | A | A | A | A | A |
| Example | 39 | A | A | A | B | A |
| Example | 40 | A | A | A | B | A |
| Example | 41 | A | A | A | A | A |
| Example | 42 | A | A | A | A | A |
| Example | 43 | A | A | A | A | A |
| Example | 44 | A | A | A | A | A |
| Comp. Example | 45 | A | C | D | D | A |
| Example | 46 | A | A | A | B | A |
| Example | 47 | A | A | B | B- | A |
| Comp. Example | 48 | A | B | B- | C | A |
| Comp. Example | 49 | A | D | D | D | A |
| Example | 50 | A | B | B- | B- | A |
| Example | 51 | A | B | B | B- | A |
| Example | 52 | A | A | A | A | A |
| Example | 53 | A | A | A | A | A |
| Comp. Example | 54 | A | A | A | A | B |

INDUSTRIAL APPLICABILITY

The surface-treated steel sheet has excellent corrosion resistance, conductivity, and coating appearance without containing a pollution control substance such as hexavalent chromium or the like. Therefore, the surface-treated steel sheet can be applied to a wide range of applications such as automobiles, home electric appliances, building materials, and the like without adversely affecting workers, users, or environments.

The invention claimed is:

1. A surface-treated steel sheet comprising:
   a steel sheet;
   a plating layer provided on at least one of the surfaces of the steel sheet, the plating layer containing at least one metal selected from the group consisting of zinc and aluminum;
   a first layer film provided on the surface of the plating layer and containing ($\alpha$) 1 to 2000 mg/m$^2$ of silica in terms of SiO$_2$, ($\beta$) a total of 1 to 1000 mg/m$^2$ of phosphoric acid groups in terms of P, ($\gamma$) a total of 0.5 to 800 mg/m$^2$ of at least one metal selected from the group consisting of Mg, Mn, and Al in terms of a metal element, and ($\delta$) 0.1 to 50 mg/m$^2$ of a tetravalent vanadium compound in terms of V; and
   a second layer film formed to a thickness of 0.1 to 5 µm on the first layer film and containing a polymeric resin (A) having at least one type of functional group selected from the group consisting of OH and COOH groups, and at least one rust-proofing additive (B) selected from the group consisting of the following compounds (a) to (e):
   (a) a phosphate;
   (b) Ca ion-exchanged silica;
   (c) a molybdate;
   (d) silicon oxide; and
   (e) at least one organic compound selected from the group consisting of triazoles, thiols, thiadiazoles, thiazoles, and thiurams.

2. The surface-treated steel sheet according to claim 1, wherein the resin (A) is a product (X) of reaction of a film-forming organic resin with an active hydrogen-containing substance (D) partially or entirely comprising a hydrazine derivative (C) having active hydrogen.

3. A surface-treated steel sheet having excellent corrosion resistance, conductivity, and coating appearance, the steel sheet comprising:
   a steel sheet having a zinc-based or aluminum-based coating;
   a composite oxide film formed as a first layer film on a surface of the steel sheet and containing ($\alpha$) silica, ($\beta$) phosphoric acid and/or a phosphoric acid compound, ($\gamma$) at least one metal selected from the group consisting of Mg, Mn, and Al wherein said at least one metal is elemental, a compound, and/or a complex compound, and ($\delta$) a tetravalent vanadium (IV) compound, the coating weights of these components being as follows:
   ($\alpha$) silica: 1 to 2000 mg/m$^2$ in terms of SiO$_2$;
   ($\beta$) phosphoric acid and/or a phosphoric acid compound: a total of 1 to 1000 mg/m$^2$ in terms of P;
   ($\gamma$) at least one metal selected from the group consisting of Mg, Mn, and Al: a total of 0.5 to 800 mg/m$^2$ in terms of Mg, Mn, or Al; and
   ($\delta$) a tetravalent vanadium compound: 0.1 to 50 mg/m$^2$ in terms of V; and
   an organic film formed as a second layer film having a thickness of 0.1 to 5 µm on the first layer film and containing an organic polymeric resin (A) having an OH group and/or a COOH group, and at least one rust-proofing additive (B) selected from the group consisting of the compounds (a) to (e) below in a total of 1 to 100 parts by mass (solid content) relative to 100 parts by mass (solid content) of the resin (A):
   (a) a phosphate;
   (b) Ca ion-exchanged silica;
   (c) a molybdate;
   (d) silicon oxide; and
   (e) at least one organic compound selected from the group consisting of triazoles, thiols, thiadiazoles, thiazoles, and thiurams.

* * * * *